United States Patent Office 3,265,244
Patented August 9, 1966

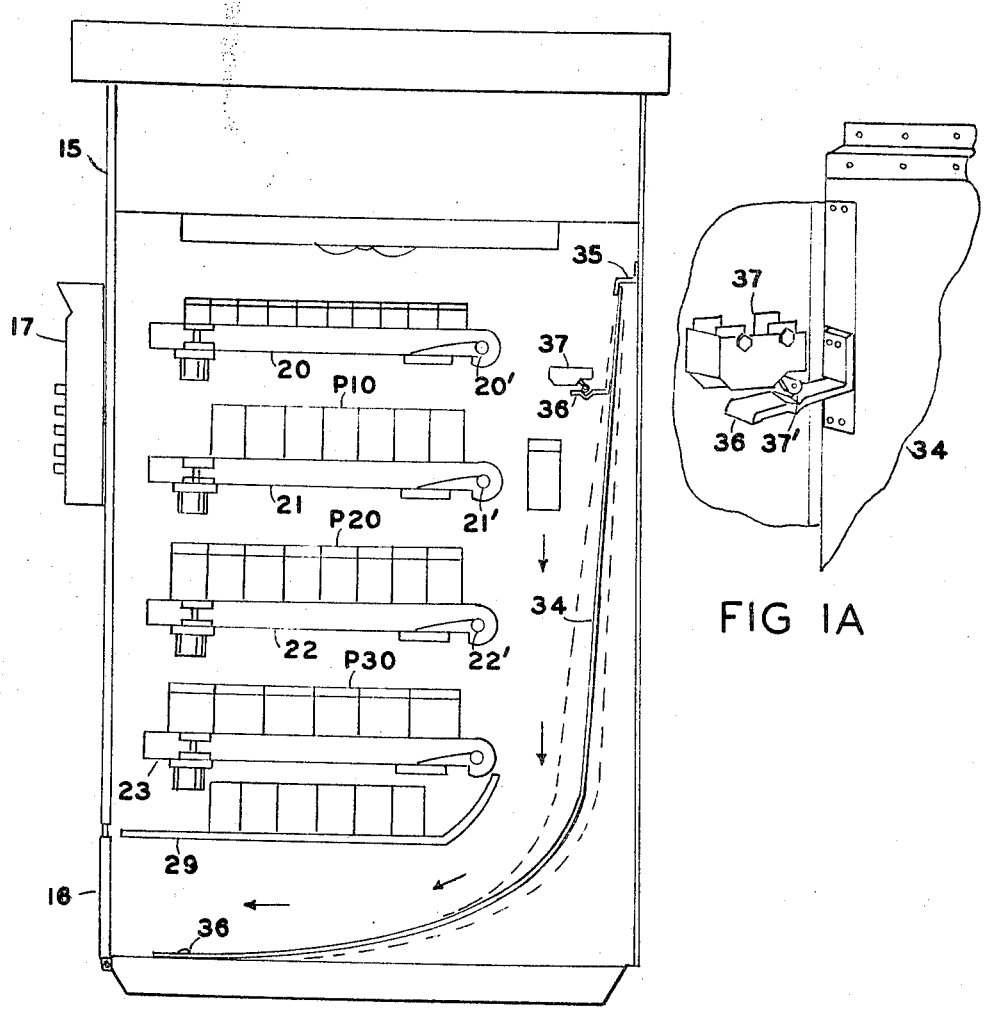

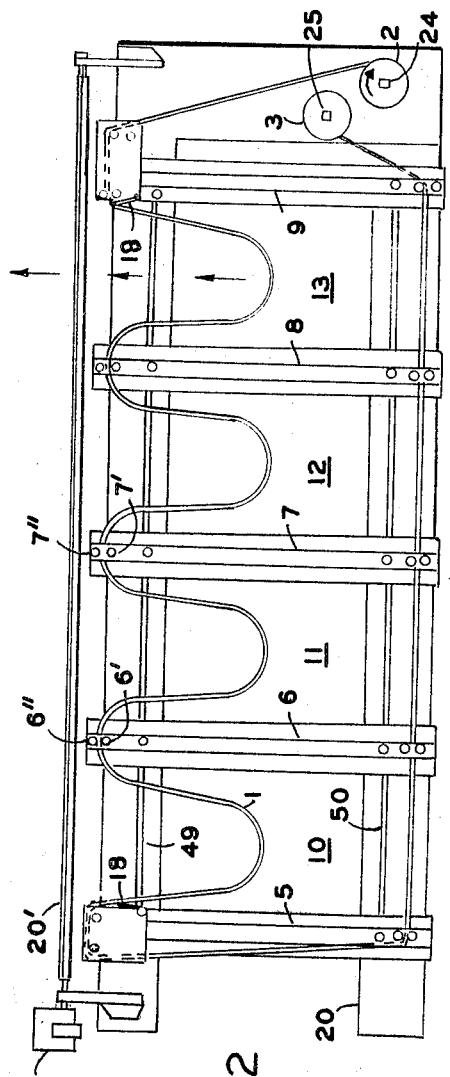
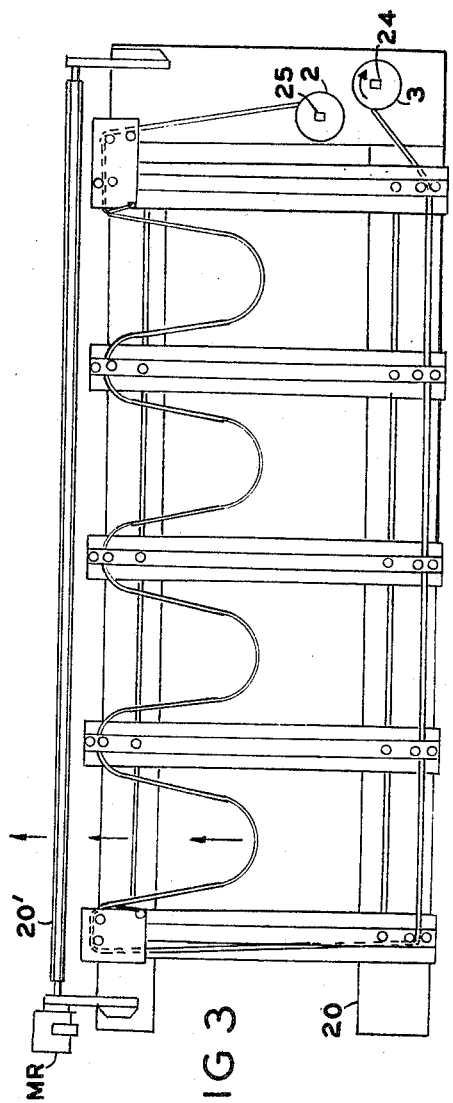

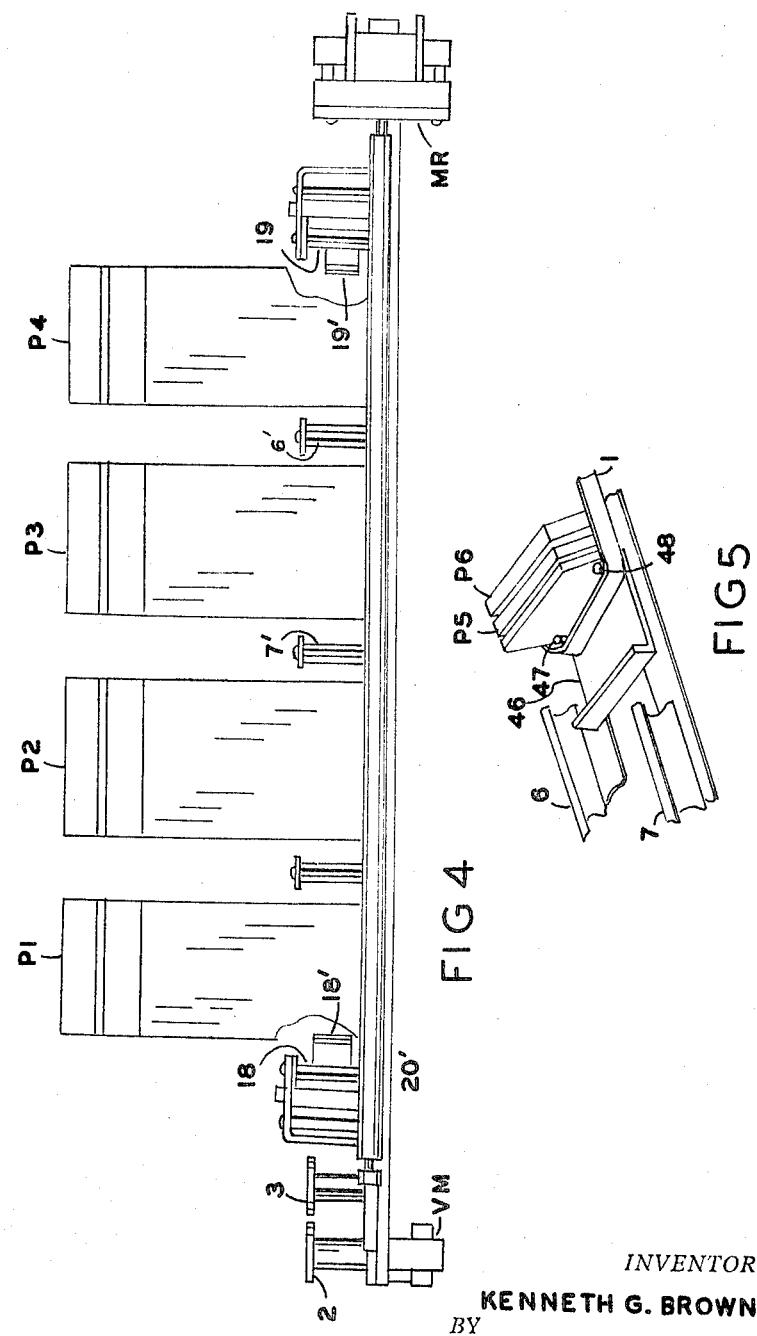

3,265,244
DISPENSER HAVING DEFORMABLE
ARTICLE DISCHARGE MEANS
Kenneth G. Brown, Wickham Ave.,
Mattituck, Long Island, N.Y.
Filed Jan. 27, 1966, Ser. No. 523,413
10 Claims. (Cl. 221—103)

This application is an improvement of my Patent No. 2,990,974, granted July 4, 1961 for Article Dispensing Means and is a continuation-in-part of my copending application, Serial No. 416,716, filed December 8, 1964 for Vending Machine, now Patent No. 3,250,431.

This invention relates to vending machines for packages or articles and more particularly for such means comprising new and improved delivery chute means.

My prior application describes vending machine means for delivering packages for instance, milk cartons, egg cartons and other similar packages. Both patent and applications have a plurality of horizontal racks which are stacked one above the other to dispense various categories of packages. The packages are mounted in columns on the racks and they are delivered off the end of the rack by motorized tape means which pushes the articles or packages off the ends of the racks.

The parent application incorporates a new delivery chute means which is arranged to deliver the packages without breakage without the necessity for an expensive or complicated elevator means.

The parent application generally comprises a sheet like flexible chute member which is mounted at the upper rear of the machine and which curves downwardly toward the bottom of the machine and under the racks in the manner of a ski slope with a gradual curvature. When the articles are pushed off the rack, they land on the yieldably mounted delivery chute, with a gentle glancing contact and slide down to the delivery door.

Since the delivery chute is flexible, yieldably mounted and due to the gentle curvature of the chute, there is a very gentle contact and breakage of fragile items are substantially eliminated. The yielding oscillating movement of the flexible chute actuates a switch which turns off the motor means which pushes the article off the rack. Rollers are provided along the ends of the rack in order to facilitate the exit of a single package off the rack so that the package will actuate the chute and stop the motor drive before a second package is pushed off the rack.

The present application has several improvements on my prior invention. The present invention includes a novel tape reversing means comprising an interchangeable pair of spools. By interchanging the spools, packages may be fed off either end of the rack. This facilitates the reloading of the machine as will be explained.

Another improvement of my invention is an improved connection between the switch and the chute which comprises a V-shape member connected to the chute which is adapted to contact the feeler arm of the switch, when the chute moves in either direction. This tends to make the machine theft proof because when the switch operation is caused by one direction of the chute, it could be held in that switch by a stick inserted through the delivery door thereby emptying the machine without the insertion of any additional coins.

Another improvement is that the rollers at the ends of the racks are powered by a high speed motor which operates at the same time as the tape motor. The surface speed of the roller is greater than that of the package due to the pushing of the tape. Therefore, the packages are ejected substantially in a feet first position. This prevents any packages from tilting so as to become jammed between the chute and the ends of the racks, and permits the use of taller packages in a given size machine.

The present invention has the following features:

(1) Power roller motor which rotates roller shaft. The speed of this is approximately 500 r.p.m. and insures that the package is ejected squarely and drops bottom first.

(2) At the discharge end of the adjustable rails we use a free wheeling nylon roller to eliminate friction at this point and allow the spool motor to pull more. We are mainly picking up friction around the packages themselves.

(3) Empty switch levers are located at the ejection end of the last rail where the packages are vended last.

(4) Where an odd shaped package is dispensed, a pusher plate is incorporated so that particularly thin packages may be placed on edge and will not rotate from the action of the tape.

(5) The delivery switch that is actuated by the fiberglass chute has a roller on its lever that sets into a formed V so that the vending cycle is stopped by either "forward" or "backward" movement of this chute.

(6) The spool motors are designed with a built-in clutch so that the spools are free spinning when loading.

(7) To insure proper rotation of a vended product, that is, first in and first out, we use one powered spool and one anchor spool with the Mylar tape fastened to each spool. By reversing these spools, the Mylar tape will eject the product from the opposite end of the vending mechanism. With this system we use three single pole switches of each end of the vending tier and they are wired as such:

The push button and vend motor empty switch are wired in parallel permitting operation from either side. A third empty switch is employed to indicate an empty light when both sides are empty and will not permit any further motor operation after being completely empty. These switches are small and compact and may be nested together as one due to the fact that a triple pole switch is not available.

Accordingly, a principal object of the invention is to provide new and improved vending machines for packages and articles.

Another object of the invention is to provide new and improved vending machines for fragile packages such as dairy products and eggs.

Another object of the invention is to provide new and improved delivery chute means for vending machines.

Another object of the invention is to provide new and improved delivery chute control means for vending machines.

Another object of the invention is to provide new and improved delivery chute means for vending machines comprising a flexible, yieldable sheet-like chute.

Another object of the invention is to provide new and improved vending means having a reversible tape drive to enable ejection from different ends of the racks.

Another object of the invention is to provide new and improved racks for vending machines comprising, a reversible tape drive and a power driven roller at the delivery end of said racks to facilitate ejection of the packages without objectionable tilting.

Another object of the invention is to provide new and improved control switch means for a vending machine of the type having a plurality of racks which are adapted to eject packages onto a flexible chute comprising switch means responsive to movement of said flexible chute in either direction.

Another object of the invention is to provide new and improved delivery chute means for vending machines having a plurality of racks for package of different products and motor means to push a selected category of packages so that one of said packages falls off one of said racks, a flexible, yieldable sheet-like chute member pivotally mounted at its upper end at the rear of the machine, said chute member extending under said racks to a delivery location and a switch adapted to be actuated by movement of said chute member in either direction to turn off said motor means which pushed said one package off the rack.

These and other objects of the invention will be apparent from the following specification and drawings of which:

FIGURE 1 is an enlarged side sectional view of the embodiment of the invention with one side removed.

FIGURE 1A is a detail view of the delivery switch.

FIGURE 2 is a plan view of one of the racks.

FIGURE 3 is a plan view of the embodiment of FIGURE 2 with the spools reversed.

FIGURE 4 is a rear view of FIGURE 3.

FIGURE 5 is a detail view of a pusher plate.

Figure 6:
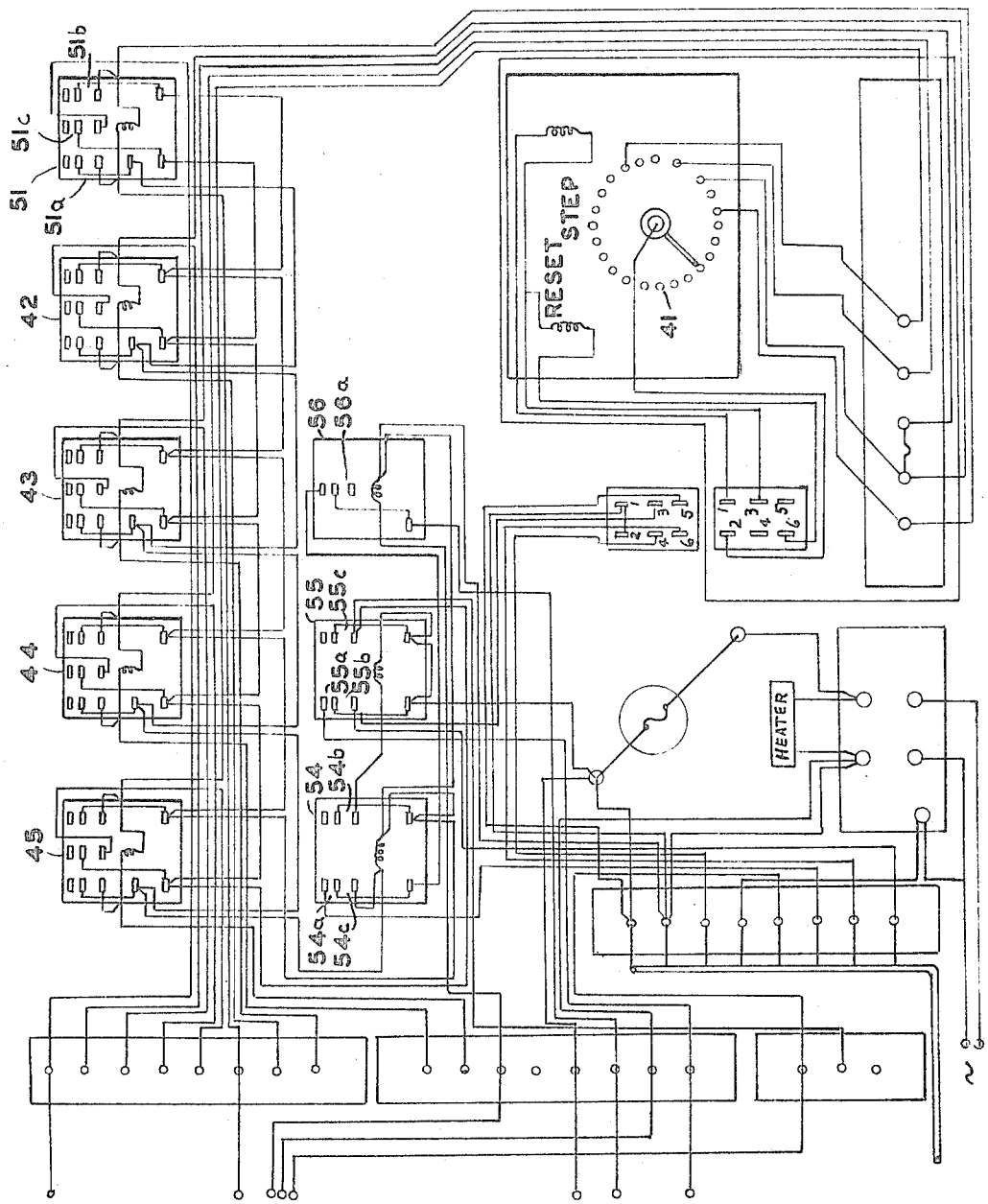
FIGURES 6 and 6A are schematic circuit diagrams.

Referring to FIGURE 1, the invention generally comprises a casing 15, which may be a relatively large refrigerator casing having a delivery door 16 at the lower front thereof. A conventional coin control mechanism 17 is mounted on the front of the casing.

The interior of the vending machine comprises a plurality of horizontal racks 20, 21, 22 and 23. Each of the racks comprise a plurality of divider members and ejecting tape which will be discussed in connection with FIGURE 3. Various categories of products P10, P20, P30, may be placed on the racks. Each rack has its own ejecting tape and motor which are started by the conventional coin control mechanism 17, as described in my above patent and application. Each of the racks have powered roller members 20', 21', 22', etc. mounted at the exit or rear end of the rack. The purpose of the power roller members is to facilitate the exit of the packages one at a time and in feet first position. In other words, when the leading package passes over the high speed roller it exits quickly in a feet first position. This provides a more positive motor control, eliminates the possibility of more than one package being pushed off at a time, and permits taller packages to be used in a given size machine. A storage rack 29 is also provided. The racks are mounted on the side wall or on bracket members. The height of the racks and the rail spacings are preferably made adjustable.

The delivery chute 34 which may comprise a sheet of fiberglass extending the full width of the machine, is mounted at the upper rear of the machine on the member 35 and extends down with a gradual curvature with a predetermined spacing behind and under the racks to the front of the machine and the vending machine delivery door. The chute is fastened to the floor or a bracket or member adjacent the floor of the machine for instance, by a screw 36 or other fastening means. The chute is not connected to the sides of the case and is free to oscillate. The lower racks are set back to permit passage of packages along the gradual curvature of the chute without interference. The mounting of the delivery chute and its light flexible construction permits it to yield upon receiving the package and this motion actuates the switch 37 which is connected to cut off the motor which is pushing the package off the rack. Due to the gentle curvature and yieldable mounting the packages contact the chute with a very gentle impact somewhat like the impact of a ski jumper upon a ski slope. A member 36 having a V-shaped projection, is affixed to the chute. The arm 37' of the switch 37 has a roller or contact point which fits in the V-shaped projection so that the switch is actuated when the chute moves in either direction.

FIGURE 2 shows a top view of a typical rack 20 and FIGURE 4 shows a rear view of the rack 20. The rack 20 has a plurality of channels 10, 11, 12 and 13 which are formed by rails 5, 6, 7, 8, and 9. The channels are open at the rear or delivery end. A tape 1 which may be made of a strong plastic, extends around the rack and into the channels and around packages in the channels. The rails have nylon rollers 6' and 7', etc. and preferably have outside guide pins 6'', 7'', etc. at their ends for the purpose of guiding the tape.

One end of the tape is connected to a spool 2 and the other end is connected to a spool 3. One spool is mounted on a motor driven spindle 24 and the other spool is mounted on a stationary spindle 25. The spindle 24 is connected to drive vend motor VM. The motor is preferably of the type having an armature which locks in only when the motor is energized. This avoids the necessity of a separate clutch.

As shown in FIGURE 2 by the arrows, when the motor is energized, the packages will be first ejected from the channel 13. The vend motor VM is stopped after one package is ejected as will be explained. During the next cycle of operation, the next package will be ejected. During the next cycles thereafter, the packages will be ejected from channels 12, 11 and 10.

After the packages in channel 13 have been delivered, then the packages in channel 12 will be delivered. The packages in channel 13 are delivered first because of the differential friction on the tape which is such that no effective force is exerted in channel 12 until the packages in channel 13 are delivered.

Along the rear of the rack is mounted a power driven roller 20' which is adapted to be driven by a motor MR. The surface speed of the roller 20' is greater than the speed of the package due to the pushing of the tape, so that the roller will effectively snatch the package away from the tape as soon as the package comes in contact with the roller. This enables ejecting of the package bottom first onto the chute and avoids objectionable tilting, of the package which might cause the package to become wedged or jammed between the rack and the chute. This is advantageous for tall thin packages like quart milk cartons.

FIGURE 3 shows an arrangement whereby the channels 10 and 11 at the other end of the rack are emptied with the same motor MV. This arrangement is provided by merely interchanging the spools 2 and 3 on the spindles. FIGURE 3 shows the packages represented by the arrows being ejected from the channel 10. The advantage of the interchangeable spool arrangement is that the package may be ejected from either end of the rack. For instance, assume in the embodiment of FIGURE 2, if the channels were completely filled with cartons of milk on a Monday and two of the channels 12 and 13 were exhausted, that day. If the tape drive was uni-directional, the remaining cartons would have to be reloaded on Tuesday into the channels 12 and 13 in order that the Monday milk would be delivered before the Tuesday milk.

All of this handling is avoided by simply interchanging the spools and thereby reversing the direction of the tape so that the packages will then be ejected from the channels 10 and 11 before the Tuesday milk will be fed. The Tuesday milk is merely loaded in the empty racks 10 and 11 without touching the Monday milk. As shown in FIGURE 6, there are actually three control switches at each end as will be explained.

FIGURE 4 shows a rear view of the embodiment of FIGURES 2 and 3 somewhat enlarged.

Referring also to FIGURES 2 and 3, the rails 5, 6, and 7 preferably are adjustably mounted on the rack by means of slots 49, 50. The packages P1, P2, P3 and P4 are mounted between the rails and are encircled by the tape 1 as illustrated in FIGURE 4. The spindle 24 is driven by the vend motor VM and the power roller 20' is driven by the motor MR. At the ends of the rails are mounted free rolling nylon rollers 6', 7', etc. for the purpose of guiding the tape. The empty switches 18 and 19, mounted on the end of the rails, have projection tongues 18' and 19' which are held in closed position by the package between the rails. The roller motor is connected in parallel with the vend motor. The roller has a high surface speed with respect to the speed of the packages caused by the tape, so that the package is snatched from the tape and ejected in a feet first position. This eliminates possible tilting of the package and jamming.

FIGURE 5 shows a pusher member for use with odd shaped packages such as very thin packages. It generally comprises a member 46, having a lower portion which is adapted to ride along the racks, and an upper portion in a vertical tilted position so that the packages P5, P6 may lean against it. A pair of nylon rollers 47 and 48 are mounted on the member 46 and the tape is passed around the rollers. This pusher member is only necessary for packages of odd sizes such as thin packages which would be unstable when leaning on its edge.

Figure 6A:
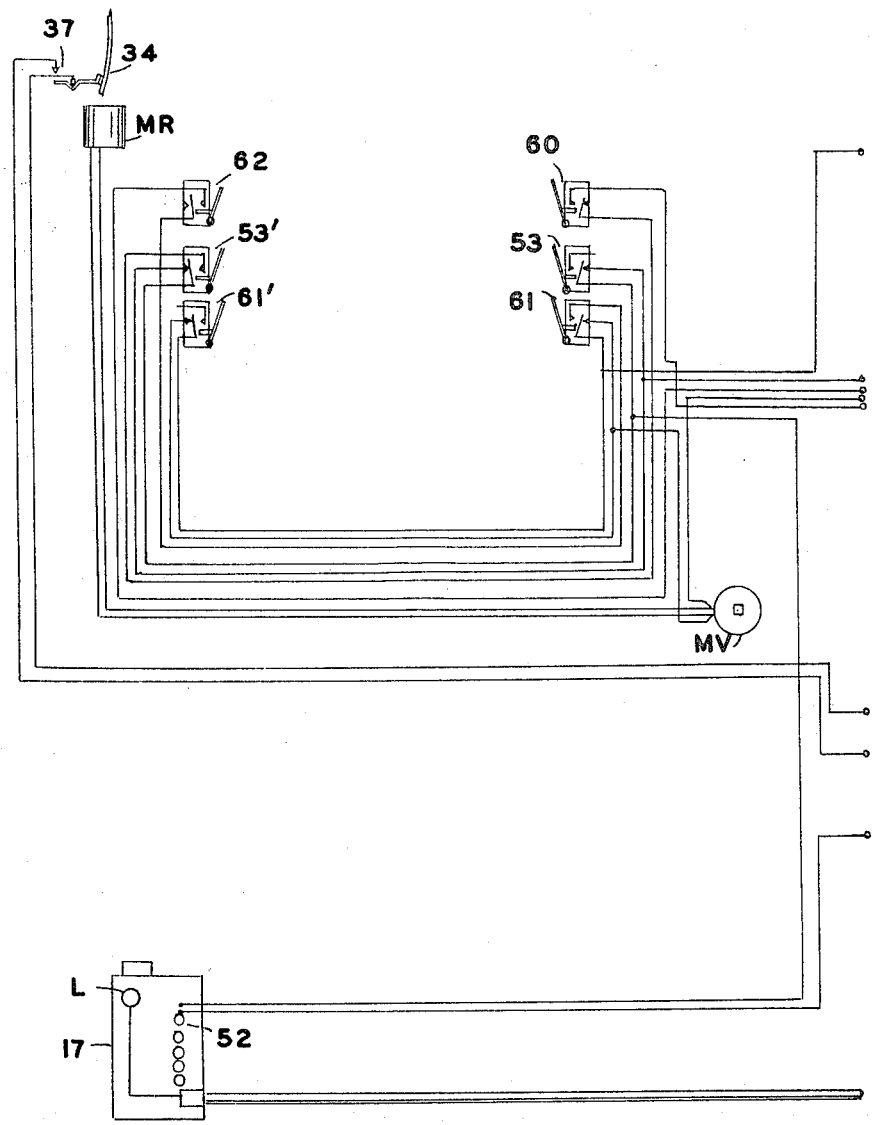

Referring to FIGURES 6 and 6A, there is shown the control portion of the invention. FIGURE 6A shows the vending motor and the roller motor and the empty switches for one tier. Any number of tiers may be used as desired. Each tier has a select relay. Five select relays are shown. The select relay for the tier shown in FIGURE 6 is the relay 51. The other major components are a hold relay 54, a collect relay 55, an empty delivery relay 56 and a stepping switch 41. The general technique is that coins are deposited in the conventional coin box and they actuate the stepping switch 41. Depending on the amount of the deposit, the stepping switch 41 then connects in the proper select relay. A push button is then pushed which initiates the vending operation and the control circuits which control the vend motor VM and power roller motor MR. The vend motor pulls the tape and places a package on top of the power roller so that the package is ejected onto chute 34. When the package hits the chute, the chute oscillates and opens the delivery switch 37. This opens the holding contacts in the circuit and stops the motors.

The coin box 17 is a conventional commercially available device such as manufactured by National Rejectors Inc., St. Louis, Mo. and as shown by a number of patents assigned to National Rejectors Inc.

Referring to FIGURES 6 and 6A, the general operation is as follows:

(1) Coin sends pulses from coin box 17 to stepping switch 41.

(1A) Stepping switch 41 completes a circuit from the proper select relay for instance, select relay 51.

(2) Press push button 52.

(3) Power goes through "Empty" switch 53 to coil of select relay 51.

(3A) Select relay 51 operates contacts 51c and connects push button power to hold relay 54.

(4) Hold relay 54 closes contacts 54c and through N.C. (normally closed) contacts 56a of empty delivery relay 56 and delivery switch 37, forms hold circuits to hold on select relay 51 and hold relay 54 after push button is released.

(5) Hold relay 54 contacts 54a also open circuit of coin switch in coin box and contacts 54b closes another circuit to energize the collect relay 55.

(6) Collect relay 55 operates and opens push button circuit contacts 55a and closes contacts 55b to the coin box to collect the money and also resets the stepping switch 41 to zero. Also, contacts 55c on the collect relay 55 supply power to motor contacts 51a of the select relay.

(7) Select relay is held on as explained above and a second set of contacts 51b on select relay circuit forms a circuit in parallel with the stepping circuit. Contacts 51c completes the circuit to motors MV and MR.

(8) The motor means moves the package. When the package hits the chute, the delivery switch 37 is opened and opens the hold circuit on the select relay and hold relay and completes the cycle.

More specifically the operation is as follows:

The depositing of coins in the conventional coin box 17 actuates switches in the coin box that send electrical pulses to the totalizer control circuit. These pulses operate the stepping switch 41 in the totalizer and advance it a number of steps to a position that determines the selling price of the item desired. At this position a circuit is completed from the select relay 51 coils that are connected to these contacts.

The selecting push buttons 52 mounted on the coin box 17 are supplied with power through the N.C. (normally closed) contacts 55a on the left side of the collect relay 55. The push button switches 52 are single pole double throw and are connected in series to prevent simultaneous operation.

Upon depressing the push button power is directed through the push button empty switch 53 in the vendor, to the coil of the select relay 51 of the item selected. Since the circuit is completed from the coil of the select relay by the totalizers stepping switch 41, the select relay operates and closes a set of contacts 51c that connects the push button power to the hold relay coil and energizes it.

Contact 54c on the hold relay, in series, with the N.C. (normally closed) contacts 56a of the empty delivery relay 56 and the delivery switch 37, supply power to hold both the select relay and the hold relay 54 energized when the power from the push button 52 is removed.

Operation of the hold relay 54 while making a holding circuit for itself and the select relay also opens the circuit 54a to the coin switches in the coin box 17 and closes another circuit 54b to energize the collect relay 55.

Operation of the collect relay 55 opens the circuit 55a to the push buttons and closes a circuit 55b that operates a solenoid in the coin box 17 to collect the money and to also reset the stepping switch 41 on the totalizer to zero. The second set of contacts 55c on the collect relay 55 close to supply power to the motor contacts 51c of the select relays.

When the select relay 51 was operated, it closed a set of contacts 51a that held it operated with current from the hold relay 54. A second set of contacts 51b completed a circuit in parallel with the circuit through the stepping switch 41 on the totalizer so that when the totalizer reset to zero the select relay remained energized. A third set of contacts 51c on the select relay completed the circuit to the tier vending motor VM that it controlled in the vendor.

When the package hits the chute the delivery switch 37 is opened and opens the hold circuits to the select relay 51 and hold relay 54. The machine is now ready for a new vending cycle.

*Operation of tier empty switches (FIG. 6A)*

Operation of a vendor requires devices to control the vending operation and also, under certain conditions, to prevent an operation. Empty switches are employed to affect this control, the push button empty switch 53, as the name implies, is in the push button circuit and when held in by merchandise in the section of the vendor, closes a circuit from the push button to the select relay and permits a vending operation, when sufficient money has been deposited and the push button is depressed. When this switch is not held in by merchandise in the vendor, it opens the circuit to the select relay thereby preventing its operation and closes a circuit to the empty light via light switch 60. An attempt to vend the item now by depressing the push button will light the empty light L in the coin box.

A second empty switch, the vend motor empty switch 61 is in the motor circuit and keeps the circuit to the vend motor closed when there is merchandise in this section of the vendor. When this switch is released by the vending of the last item, it opens the circuit to the vend motor thereby stopping the motor and closes a circuit to the empty delivery relay 56. As the empty delivery relay is in series with the delivery switch 37, the operating of either at this time will end the vending cycle. All empty switches are spring loaded outwardly. Packages in the channel hold the switches against the spring pressure.

*Reversible vending*

For reversible vending, vending from alternate sides, of a tier a double set of "Empty" switches are required.

These switches, the push button 53, 53' and the vend motor 61, 61' switches have their input common connections and their output normal open contacts (held closed by merchandise on the tier), wired in parallel permitting the initiating of a vending operation through either push button empty switch and allowing a vending operation to continue, unless a delivery is made, until both vend motor empty switches 61, 61' are released.

To provide a means of lighting an empty light another switch 60 is required. This switch is mounted on the right hand side and operated together with the push button and vend motor switches, making, in effect, a three pole double throw switch. This third switch or section is wired in series from the N.C. (normally closed) contact of the push button switch 53', on the opposite side of the vending tier. It is connected to close the circuit to the empty light L when not held in by merchandise on the vendor tier.

To provide a means of operating the empty delivery relay 56 another switch 62 is required. This switch is mounted on the left hand side and operated together with the push button and vend motor switches, also making, in effect, a three pole double throw switch. This third switch or section is wired in series from the N.C. (normally closed) contact of the vend motor switch 61 on the opposide side of the vending tier. It is connected to close the circuit to the empty delivery relay 56 when not held in by merchandise on the vending tier.

The package handling means has utility apart from the coin control circuits for instance, the tape drive may be operated by an operator connecting the proper motor. The racks could be installed in a supermarket or warehouse with the vend motors directly connected to keyboard switches which are manually operated by an operator.

Many modifications may be made by those who desire to practice the invention without departing from the scope thereof, which are defined by the following claims.

I claim:
1. A vending machine comprising,
a cabinet,
a plurality of horizontal racks mounted inside said cabinet and each rack extending from the front portion of said cabinet to a predetermined distance from the rear of said cabinet, each of said racks having a plurality of channels thereon,
tape drive pusher means connected to each of said racks to push a package off the rear end of each of said racks,
motor means to operate said pusher means,
a flexible chute member one end thereof mounted at the upper rear portion of said cabinet, said chute member extending downwardly and forwardly under said racks and attached to a point at the bottom of the front portion of said cabinet,
a delivery door in said cabinet adjacent the bottom of said cabinet and adjacent said point,
said chute being spaced predetermined distances from the rears of said racks so that a package falling off any of said racks will slide down on said chute safely to said delivery door, the impact of said package on said chute causing a movement of said flexible chute,
a stationary switch mounted in said cabinet, said switch having a feeler arm, a V-shaped member fixedly connected to said flexible chute and adapted to be actuated by movement of said chute in either direction, said switch being connected to stop said motor means after one package has been delivered to said chute.

2. A vending machine as in claim 1 having powered roller means at the rear end of said racks, said roller means having a surface speed greater than the package speed due to the pusher tape, whereby the packages are ejected from said rack without objectionable tilting.

3. Apparatus as in claim 1 wherein each said racks have means to eject packages first from one or the other of said channels comprising a pair of interchangeable spools connected to said tape means.

4. A vending machine comprising a rack with a plurality of channels, tape drive pusher means adapted to push packages out of said channels,
a rotatable spindle mounted on said rack,
motor means connected to said spindle,
a stationary spindle mounted adjacent said first spindle,
first and second spools adapted to fit on said spindles, one end of said tape being connected to each of said spools, said spools being interchangeable so that when said first spool is placed on said driven spindle, packages are ejected first from one of said channels and when said second spool is placed on said driven spindle then packages will be ejected first from the other of said channels,
thereby eliminating need for reloading the channels in order to insure first in and first out ejecting of the packages.

5. Apparatus as in claim 1 having control switches mounted at the mouths of said channels, said switches being adapted to be held in one position by packages in said racks.

6. Apparatus as in claim 4 having control switches mounted at the mouths of said channels, said switches being adapted to be held in one position by packages in said channels.

7. Apparatus as in claim 1 having freely rotatable guide rollers at the ends of said channels to guide said tape.

8. Apparatus as in claim 4 having freely rotatable guide rollers at the ends of said channels to guide said tape.

9. Apparatus as in claim 1 having a pusher member slidably mounted in said channels to hold odd shaped packages.

10. Apparatus as in claim 4 having a pusher member slidably mounted in said channels to hold odd shaped packages.

References Cited by the Examiner
UNITED STATES PATENTS

| | | | |
|---|---|---|---|
| 1,022,680 | 4/1912 | Johnson | 221—231 |
| 1,677,939 | 7/1928 | Vinogradow | 221—260 |
| 1,789,300 | 1/1931 | Bihl et al. | 221—260 |
| 2,202,112 | 5/1940 | McKelvy | 221—260 |
| 2,531,238 | 11/1950 | Tandler et al. | 221—110 |
| 2,590,736 | 3/1952 | Tandler et al. | 221—260 |
| 2,637,611 | 5/1953 | Tandler et al. | 221—110 |
| 2,681,842 | 6/1954 | Rabkin et al. | 221—125 |
| 2,705,144 | 3/1955 | Ridgway. | |
| 2,990,974 | 7/1961 | Brown | 221—103 |
| 3,001,669 | 9/1961 | Tandler et al. | 221—110 X |
| 3,064,856 | 11/1962 | Council | 221—103 X |
| 3,094,241 | 6/1963 | Lashley | 221—110 |

ROBERT B. REEVES, *Primary Examiner.*
W. SOBIN, *Assistant Examiner.*